US012694546B2

(12) United States Patent
Barth

(10) Patent No.: US 12,694,546 B2
(45) Date of Patent: Jul. 28, 2026

(54) METHOD AND SYSTEM FOR CORRECTING A POSITION OF AT LEAST ONE FEATURE IN THE SURROUNDINGS OF AN EGO VEHICLE

(71) Applicant: Continental Autonomous Mobility Germany GmbH, Ingolstadt (DE)

(72) Inventor: Peter Barth, Wolnzach (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 277 days.

(21) Appl. No.: 18/566,408

(22) PCT Filed: May 20, 2022

(86) PCT No.: PCT/DE2022/200103
§ 371 (c)(1),
(2) Date: Dec. 1, 2023

(87) PCT Pub. No.: WO2022/253391
PCT Pub. Date: Dec. 8, 2022

(65) Prior Publication Data
US 2024/0273743 A1 Aug. 15, 2024

(30) Foreign Application Priority Data

Jun. 1, 2021 (DE) ..................... 10 2021 205 593.1

(51) Int. Cl.
*G06T 7/50* (2017.01)
*G06F 17/17* (2006.01)
(Continued)

(52) U.S. Cl.
CPC ............... *G06T 7/50* (2017.01); *G06F 17/17* (2013.01); *G06T 7/73* (2017.01); *G06V 10/80* (2022.01);
(Continued)

(58) Field of Classification Search
CPC ... G06T 7/50; G06T 7/73; G06T 2207/10028; G06T 2207/30252; G06T 2207/10016;
(Continued)

(56) References Cited

U.S. PATENT DOCUMENTS

| | | | | |
|---|---|---|---|---|
| 2,648,908 | A | * | 8/1953 | Stone ...................... B43L 13/14 |
| | | | | 33/434 |
| 8,428,305 | B2 | * | 4/2013 | Zhang .................. G06V 20/588 |
| | | | | 382/254 |

(Continued)

FOREIGN PATENT DOCUMENTS

| | | | |
|---|---|---|---|
| DE | 102014207523 A1 | 10/2015 | |
| DE | 102020205468 A1 | 11/2021 | |

(Continued)

OTHER PUBLICATIONS

Raphael Voges and Bernardo Wagner: "Interval-Based Visual-LiDAR Sensor Fusion", Apr. 2021; IEEE Robotics and Automation Letters, vol. 6; pp. 1304-1311 (Year: 2021).*

(Continued)

*Primary Examiner* — Siamak Harandi
(74) *Attorney, Agent, or Firm* — Fitch, Even, Tabin & Flannery LLP

(57) ABSTRACT

A method for correcting a position of at least one feature in the surroundings of an ego vehicle by means of a fusion of data from at least a first and a second surroundings detection sensor, including: recording the surroundings of the ego vehicle using the first surroundings detection sensor and generating a first representation of the surroundings; recording the surroundings of the ego vehicle using the second surroundings detection sensor and generating a second representation of the surroundings; detecting at least one feature in the first representation of the surroundings; determining the position of the at least one feature based on the first representation of the surroundings; determining a height (Continued)

profile in an area in front of the ego vehicle based on the second representation of the surroundings; fusing the position of the at least one detected feature and the determined height profile and determining a corrected position; and correcting the position of the at least one feature based on the determined corrected position.

4 Claims, 2 Drawing Sheets

(51) Int. Cl.
| | | |
|---|---|---|
| *G06T 7/521* | (2017.01) | |
| *G06T 7/55* | (2017.01) | |
| *G06T 7/73* | (2017.01) | |
| *G06V 10/80* | (2022.01) | |

(52) U.S. Cl.
CPC ............... *G06T 2207/10028* (2013.01); *G06T 2207/30252* (2013.01)

(58) Field of Classification Search
CPC  G06T 7/55; G06T 7/521; G06F 17/17; G06V 10/80

See application file for complete search history.

(56) References Cited

U.S. PATENT DOCUMENTS

| | | | |
|---|---|---|---|
| 2013/0261921 | A1 | 10/2013 | Bando et al. |
| 2015/0301159 | A1 | 10/2015 | Scheschko et al. |
| 2017/0320437 | A1* | 11/2017 | Liebau .................... G01S 17/89 |
| 2021/0157321 | A1* | 5/2021 | Wang ........................ G06T 7/62 |

FOREIGN PATENT DOCUMENTS

| | | | |
|---|---|---|---|
| EP | 3907108 | A1 | 11/2021 |
| JP | 2019089476 | A | 6/2019 |

OTHER PUBLICATIONS

German Office Action dated Mar. 16, 2022 for the priority German Patent Application No. 10 2021 205 593.1 and translation of same.
German Notice of Allowance dated Jul. 5, 2022 for the priority German Patent Application No. 10 2021 205 593.1 and translation of same.
The International Search Report and the Written Opinion of the International Searching Authority mailed on Aug. 8, 2022 for the PCT Application No. PCT/DE2022/200103 which this application claims priority.
Voges Raphael et al: "Interval-Based Visual-LiDAR Sensor Fusion", IEEE Robotics and Automation Letters, vol. 6, Issue: 2, Apr. 2021, Date of Publication: Feb. 5, 2021 (Feb. 5, 2021), pp. 1304-1311, XP011839813, DOI: 10.1109/LRA.2021.3057572.
Letter of Reasons for Refusal delivered on Jul. 24, 2024 from corresponding Japanese patent application No. 2023-563196.
Japanese Office Action dated Feb. 20, 2025 corresponding to Japanese Patent Application No. 2023-563196.

* cited by examiner

METHOD AND SYSTEM FOR CORRECTING A POSITION OF AT LEAST ONE FEATURE IN THE SURROUNDINGS OF AN EGO VEHICLE

CROSS-REFERENCE TO RELATED APPLICATIONS

The present application is a National Stage Application under 35 U.S.C. § 371 of International Patent Application No. PCT/DE2022/200103 filed on May 20, 2022, and claims priority from German Patent Application No. 10 2021 205 593.1 filed on Jun. 1, 2021, in the German Patent and Trademark Office, the disclosures of which are herein incorporated by reference in their entireties.

BACKGROUND

1. Field

Embodiments of the present application relate to a method and a system for correcting a position of at least one feature in the surroundings of an ego vehicle.

2. Description of Related Art

Feature extraction for use in ADAS systems (e.g., other road users, lane geometry, drivable area, etc.), which takes place in the camera image, is, for example, known from the prior art. Additionally, intrinsic as well as extrinsic calibration of the camera takes place in order to convert the extracted features in the image into the vehicle coordinate system. In this case, there are currently 3 fundamental approaches.

There exists a flat world assumption. This means that it is assumed that everything in the field of view of the camera is located on one plane (e.g., the street) which does not have any differences in height. Furthermore, a stereo camera is used in order to obtain an item of depth/height information and, therefore, to obtain an item of 3D information by association in both camera images. Thirdly, it is known that the depth and height are estimated via techniques such as optical flow.

SUMMARY

Embodiments of the present application relate to a method and a system by means of which increased accuracy is achieved during the determination of the position of features.

Initial considerations were that the camera inherently has a very high resolution for features which are located very close to the vehicle, but very quickly has a very low resolution for features which are further away. Therefore, the extraction results are, fundamentally, quickly inaccurate. Whilst it is true that the lateral resolution (that is to say, the angle of the feature with respect to the ego vehicle) is good, the height or distance of the feature from the car already contains major defects after a few meters. The problem exists, to varying degrees, with all 3 of the aforementioned techniques. In particular, the errors are coupled to the calculation of height and distance.

According to an aspect of an embodiment, there is provided a method for correcting a position of at least one feature in the surroundings of an ego vehicle by means of a fusion of data from at least a first and a second surroundings detection sensor is therefore proposed, the method including: recording the surroundings of the ego vehicle using the first surroundings detection sensor and generating a first representation of the surroundings; recording the surroundings of the ego vehicle using the second surroundings detection sensor and generating a second representation of the surroundings; detecting at least one feature in the first representation of the surroundings; determining the position of the at least one feature based on the first representation of the surroundings; determining a height profile in an area in front of the ego vehicle based on the second representation of the surroundings; fusing the position of the at least one detected feature and the determined height profile and determining a corrected position; correcting the position of the at least one feature based on the determined corrected position.

The first surroundings detection sensor is preferably a camera and the second surroundings detection sensor is a radar or lidar sensor. Accordingly, the first representation of the surroundings is a camera image and the second representation of the surroundings is a list of objects or a point cloud. The at least one feature can be, for example, an object such as, e.g., a road sign, a roadway boundary or similar or another road user such as, for example, a further vehicle, a pedestrian or a cyclist or similar. In order to detect a feature in the first representation of the surroundings, a semantic segmentation can, for example, be carried out. The area in front of the vehicle preferably describes the roadway or road surface located in front of the vehicle. The detection of the feature, the determination of the position, the determination of the height profile, the fusion as well as the correction of the position are preferably conducted in a corresponding computing unit. Said computing unit is preferably an ECU or an ADCU. It would also be conceivable to use a sensor computing unit, for example the computing unit of a camera, for the method steps. In this case, the generated representations of the surroundings are transmitted to the computing device.

In a preferred embodiment, the position of the feature is output in a flat world assumption in x- and y-coordinates in the first representation of the surroundings. The reference plane of said flat world assumption would be the roadway surface. Based on said assumption, the distance of the ego vehicle from said feature can also be determined. The coordinates are based on the correspondingly calibrated coordinate system of the first surroundings detection sensor. It would also be conceivable for the first surroundings detection sensor to already have a height model and not to use a flat world assumption. In said case, the height model of the first surroundings detection sensor is, as a general rule, relatively inaccurate. On the other hand, the height model based on the data of the second surroundings detection sensor is significantly more precise and more detailed. The method can also be carried out as described in such a configuration.

In a further preferred configuration, a geometric intersection is applied to the fusion of the height profile with the position of the at least one feature. In simplified terms, this means that the line of sight of the first surroundings detection sensor, preferably a camera, is intersected with the determined height profile. The line of sight can be substantially described as the rays of light which travel from the object to the first surroundings detection sensor. Depending on the height profile, the line of sight may have to be lengthened. Thus, the two data can be fused and the corrected position can be determined, since the height profile is known at this point in time and it is also known where the first surroundings detection sensor is located.

In a preferred configuration, a regression method is applied to the determination of the height profile. To this end, at least two data points having height information are determined from the data of the second surroundings detection sensor.

A least squares method is particularly preferably applied as the regression method in one configuration of the method. This is particularly preferably a linear least squares method. In this case, a linear model or a polynomial model can be used. The least squares method generally describes a mathematical method for adjustment computation. In this case, a function which runs as close as possible to the measuring points and, consequently, summarizes the data in the best possible way, is determined regarding a quantity of measuring points. For example, measured values of the LIDAR sensor can be used and the z-coordinates of the point cloud supplied by the LIDAR are used as the height and the x-coordinates as the position in order to estimate a height profile model which indicates a height in front of the vehicle. Only points which have not such a high y-deviation from the x-axis are used.

According to an aspect of the application, there is provided a system for correcting a position of at least one feature in the surroundings of an ego vehicle including a computing unit.

The computing unit can be configured, for example, as an ECU or ADCU which is installed as a separate element in the ego vehicle. It would also be conceivable for the computing unit for carrying out the method to be part of one of the sensors.

BRIEF DESCRIPTION OF THE DRAWINGS

Further advantageous configurations are the subject-matter of the drawings, wherein.

DETAILED DESCRIPTION

Figure 1:
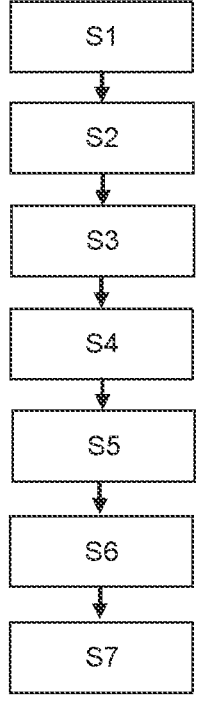
FIG. 1 shows a schematic flow chart of a method according to an embodiment of the application.

FIG. 1 shows a method for correcting a position P of at least one feature in the surroundings of an ego vehicle by means of a fusion of data from at least a first 1 and a second surroundings detection sensor 2, said method comprising the following steps: In a step S1, the surroundings of the ego vehicle are recorded using the first surroundings detection sensor 1, and a first representation of the surroundings is generated. In a step S2, which can run at the same time as or after step S1, the surroundings of the ego vehicle are recorded with the second surroundings detection sensor 2 and a second surroundings representation is generated. In a step S3, at least one feature is detected in the first representation of the surroundings. In a subsequent step S4, the position P of the at least one feature is determined based on the first representation of the surroundings. In a step S5, a height profile 3, 5 is determined in an area in front of the vehicle based on the second representation of the surroundings. The height profile 3, 5 can be, e.g., an upward gradient 3 or a downward gradient 5. It would also be conceivable for there to not only be a constant downward gradient 5 or an upward gradient 3, but for both to alternate at certain intervals and, consequently, for there to be smaller corrugations over a specific stretch. In a step S6, the position P of the at least one detected feature and the determined height profile 3, 5 are fused and a corrected position is determined. Finally, in step S7, the position P of the at least one feature is corrected, based on the determined corrected position.

Figure 2:
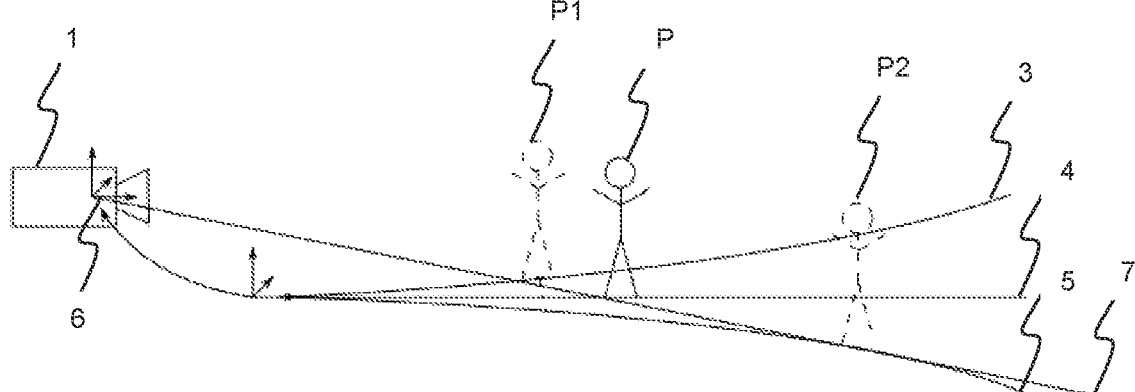
FIG. 2 shows a schematic representation of a scene having position detection.

FIG. 2 shows a schematic representation of a scene having position detection. As depicted in FIG. 2, the surroundings of the ego vehicle are recorded by means of the first surroundings detection sensor 1, in this case a camera. In these surroundings, the position P of a feature, in the representation a person, is determined in the camera image. The reference coordinate system 6 of the camera is calibrated for a flat world assumption 4. This means that the reference plane of the flat world assumption 4 is the road surface. Based on this assumption, the camera 1 now detects the feature in the detection area 7 of the camera 1 and determines the position P thereof. However, the actual road profile can have, for example, an upward gradient 3 or a downward gradient 5, which is why it is necessary to correct the determined position P since the position is not determined correctly due to the flat world assumption 4. In this case, the reference numeral P1 designates a corrected position P1 in the case of a potential upward gradient 3 and the reference numeral P2 designates a corrected position P2 in the case of a potential downward gradient 5. Due to the different roadway profiles 3, 5, the actual or corrected position P1, P2 differs, in part, considerably from the position P determined based on the flat world assumption 4.

Figure 3:
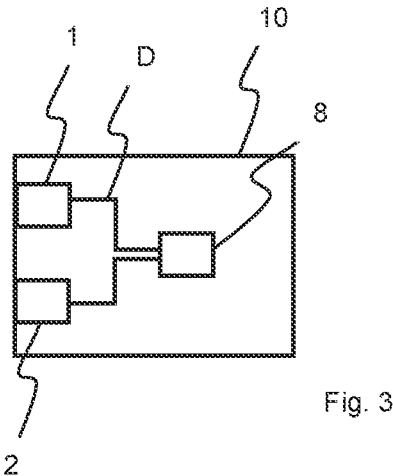
FIG. 3 shows a schematic view of a system according to an embodiment of the application.

A schematic view of a system 10 according to an embodiment of the application is shown in FIG. 3. The system 10 comprises a first 1 and a second surroundings detection sensor 2. Furthermore, a computing unit 8 is provided, by means of which a method according to the application can be carried out. In said configuration, the computing unit 8 is provided as a separate element, e.g., as an ECU/ADCU, in the ego vehicle. In this case, the first 1 and the second surroundings detection sensor 2 are connected to the computing unit 8 by means of a data connection D. It would also be conceivable to integrate the computing unit 8 for carrying out the method in one of the sensors 1, 2. The data connection D can, for example, be configured to be wired or wireless.

The invention claimed is:

1. A method for correcting a position of at least one feature in surroundings of an ego vehicle by means of a fusion of data from at least a first surroundings detection sensor and a second surroundings detection sensor, the method comprising:

recording the surroundings of the ego vehicle using the first surroundings detection sensor;

generating a first representation of the surroundings based on the surroundings of the ego vehicle recorded using the first surroundings detection sensor;

recording the surroundings of the ego vehicle using the second surroundings detection sensor;

generating a second representation of the surroundings based on the surroundings of the ego vehicle recorded using the second surroundings detection sensor;

detecting a feature in the first representation of the surroundings;

determining a position of the feature based on the first representation of the surroundings;

determining a height profile in an area in front of the ego vehicle based on the second representation of the surroundings; and determining a corrected position based on the feature and the height profile, wherein determining of the corrected position is accomplished by intersecting a line of sight of the first surroundings detection sensor with the height profile.

2. The method according to claim 1, further comprising outputting the position of the feature in a flat world assumption in x- and y-coordinates in the first representation of the surroundings.

3. The method according to claim 1, wherein determining the height profile comprises applying a regression method to the height profile.

4. The method according to claim 3, wherein applying the regression method comprises applying a least squares method to the height profile.

* * * * *